United States Patent
Xu et al.

(10) Patent No.: US 9,140,332 B2
(45) Date of Patent: Sep. 22, 2015

(54) RATIONAL SPEED-REDUCTION DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xiao-Ming Xu, Shenzhen (CN); Cheng Zhang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/059,749

(22) Filed: Oct. 22, 2013

(65) Prior Publication Data

US 2015/0111691 A1    Apr. 23, 2015

(30) Foreign Application Priority Data

Nov. 9, 2012  (CN) .......................... 2012 1 0446415

(51) Int. Cl.
*F16H 57/08* (2006.01)
*F16H 1/28* (2006.01)

(52) U.S. Cl.
CPC ........................................ *F16H 1/28* (2013.01)

(58) Field of Classification Search
CPC ........................................................ F16H 1/28
USPC .............. 475/331, 348, 347, 159, 162, 178; 74/606 R, 607
See application file for complete search history.

(56) References Cited

U.S. PATENT DOCUMENTS

| | | | |
|---|---|---|---|
| 8,287,423 B2* | 10/2012 | Lopez et al. ................... | 475/347 |
| 8,430,788 B2* | 4/2013 | Fox et al. ....................... | 475/347 |
| 2011/0028265 A1* | 2/2011 | Johnson et al. ................ | 475/331 |
| 2011/0062769 A1* | 3/2011 | Haeusler ........................ | 301/6.5 |
| 2011/0251010 A1* | 10/2011 | Grimm .......................... | 475/159 |
| 2011/0281682 A1* | 11/2011 | Scekic ........................... | 475/331 |

* cited by examiner

*Primary Examiner* — David J Hlavka
(74) *Attorney, Agent, or Firm* — Novak Druce Connolly Bove + Quigg LLP

(57) ABSTRACT

A rotational speed-reduction device is disclosed. The speed-reduction device includes a flange, a planetary bracket fixedly mounted on the flange, a planetary gear assembly movably mounted on the planetary bracket, a first bearing sleeved on the planetary bracket, an input member, and an output member. The planetary bracket includes a mounting portion, a fixing portion fixed to the flange, and a support portion. The support portion connects the mounting portion to the fixing portion. The planetary gear assembly includes a number of planetary gear pairs movably mounted between the fixing portion and the mounting portion, a fixing shaft passing through the planetary gear pairs, and rotation members movably received between the planetary gear pairs and sleeved on the fixing shaft. Opposite ends of the fixing shaft are connected to the mounting portion and the fixing portion, respectively.

18 Claims, 4 Drawing Sheets

RATIONAL SPEED-REDUCTION DEVICE

BACKGROUND

1. Technical Field

The present disclosure generally relates to speed reduction devices, and particularly to a rotational speed-reduction device applied to a robot.

2. Description of Related Art

Speed-reduction devices, such as planetary gear speed-reduction devices, include a planetary gear assembly and a mounting portion. However, vibration generated during operation thereof may cause a movement of the mounting portion toward the planetary gear assembly. Thus, a rotation of the planetary gear assembly may be adversely affected.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
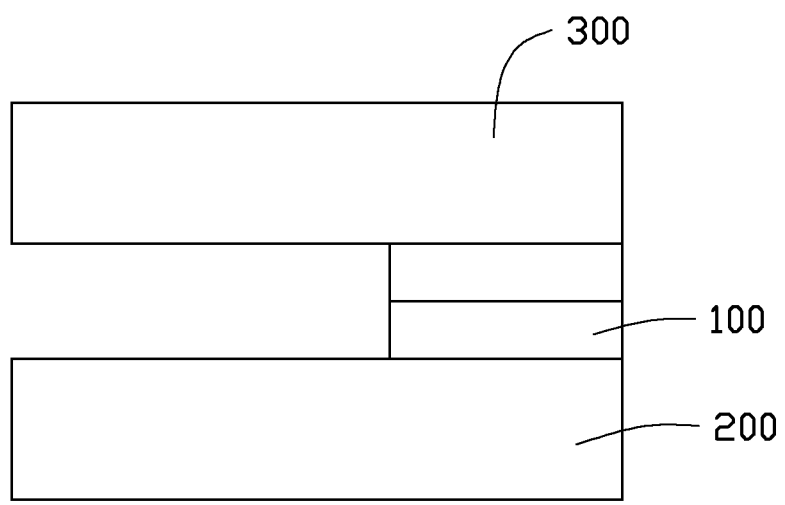
FIG. 1 shows one embodiment of a rotational speed-reduction device applied to a robot.

FIG. 1 shows an embodiment of a rotational speed-reduction device 100 is applied to connect a first robotic arm 200 to a second robotic arm 300 of a robot (not shown). The rotational speed-reduction device 100 is configured for transmitting rotational energy of the first robotic arm 200 to the second robotic arm 300, thereby reducing speed and increasing torque. In the illustrated embodiment, the rotational speed-reduction device 100 is a planetary gear reducer.

Figure 2:
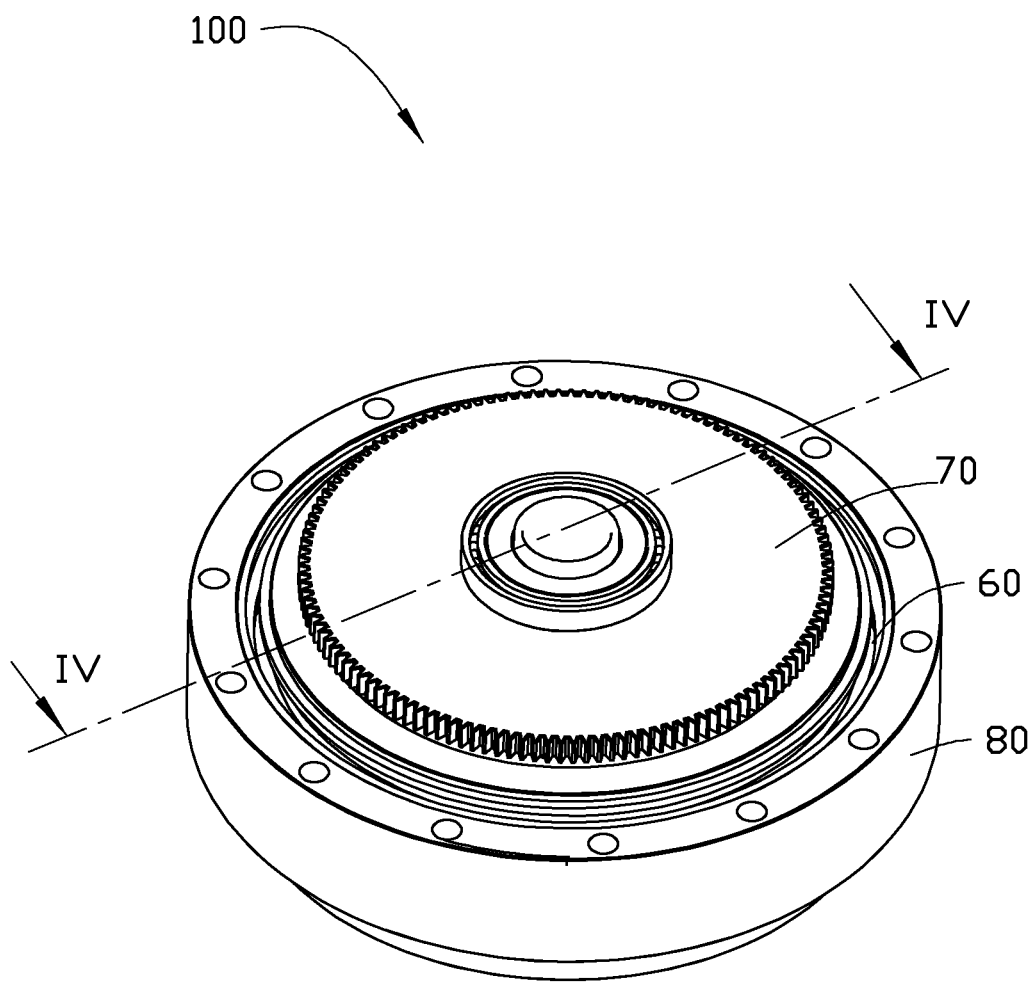
FIG. 2 shows an assembled, isometric view of the rotational speed-reduction device of FIG. 1.
Figure 3:
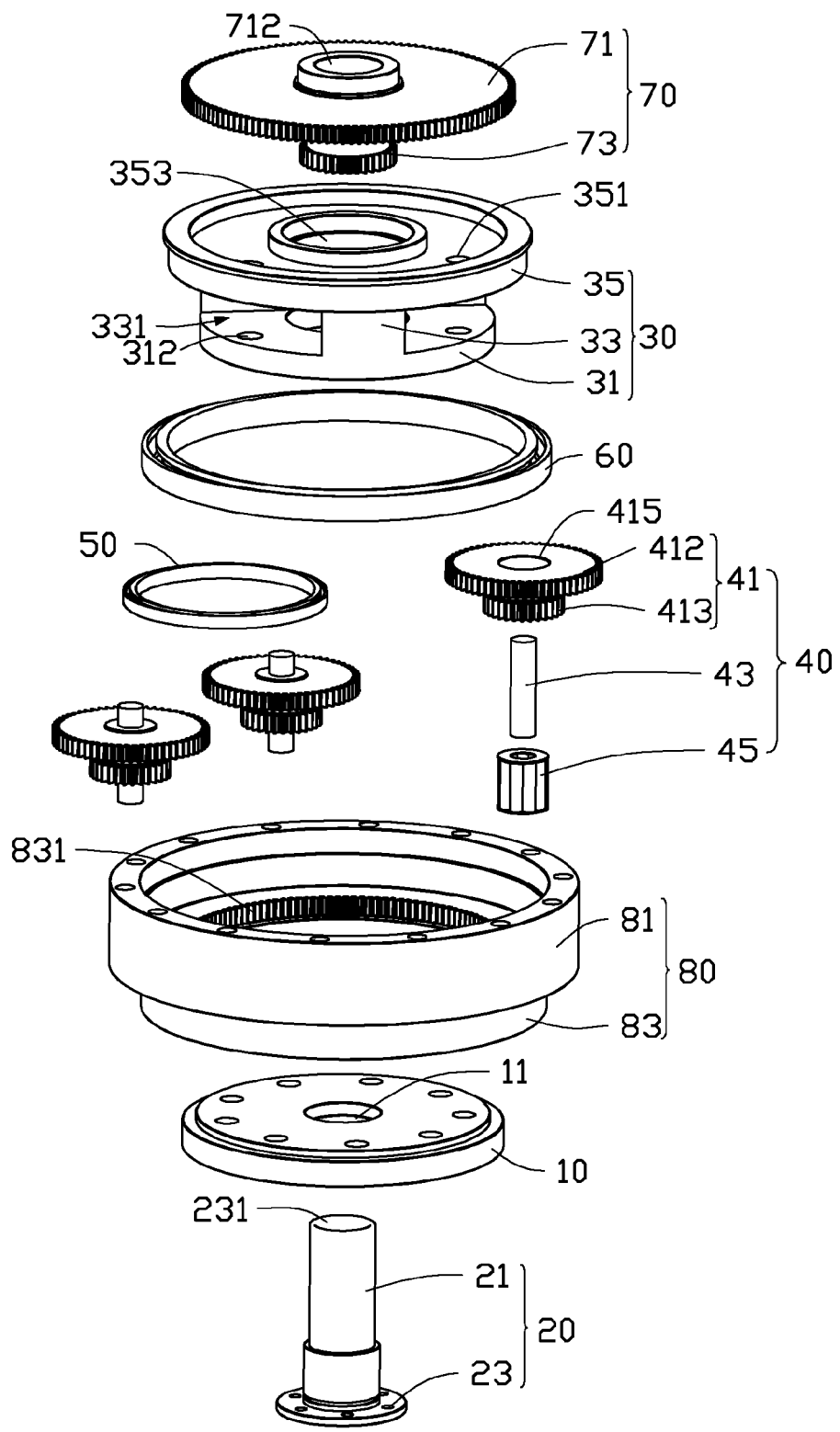
FIG. 3 shows an exploded, isometric view of the rotational speed-reduction device shown in FIG. 2.
Figure 4:
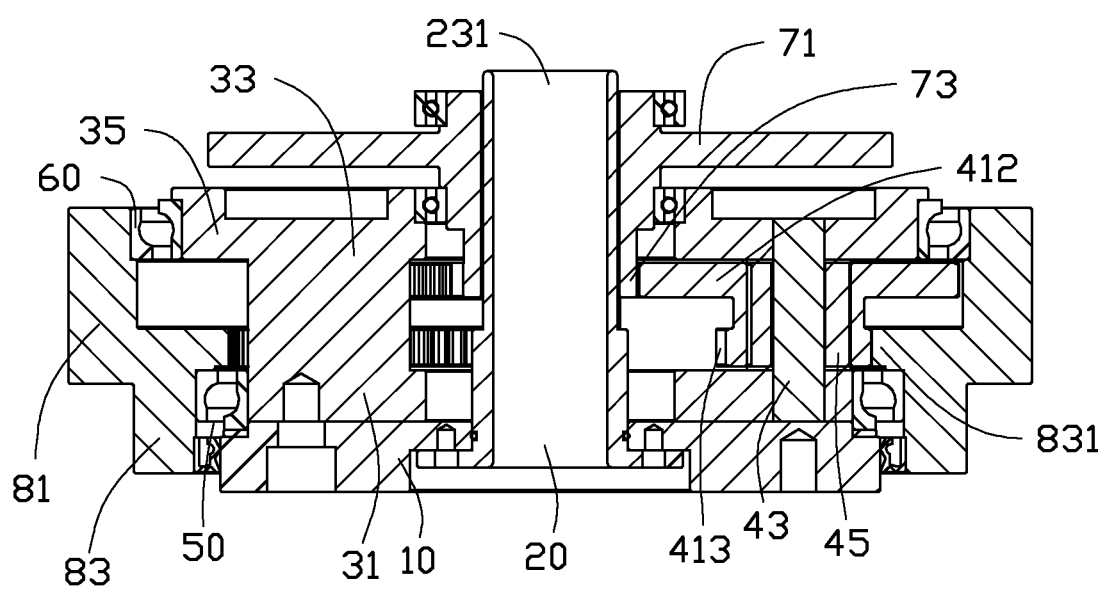
FIG. 4 shows a cross-sectional view of the rotational speed-reduction device, taken along line IV-IV of FIG. 2.

FIGS. 2 through 4 show the rotational speed-reduction device 100 in detail. The rotational speed-reduction device 100 includes a flange 10, a sleeve 20, a planetary bracket 30, three planetary gear assemblies 40, a first bearing 50, a second bearing 60, an input member 70, and an output member 80.

The flange 10 is substantially disk-like and is mounted on the first robotic arm 200. The flange 10 defines a through hole 11 in a substantially central portion thereof.

The sleeve 20 is a substantially hollow cylinder and includes a fixing portion 23 and a main portion 21 extending from a substantially central portion of the fixing portion 23. The fixing portion 23 is substantially disc-like. The main portion 21 is substantially a hollow cylinder and is received by the through hole 11 of the flange 10. A through hole 231 is axially defined through the fixing portion 23 and the main portion 21, respectively, for wires or cables of the robot arm to pass through. An axis of the through hole 231 overlaps an axis of the first robotic arm 200.

The planetary bracket 30 is sleeved on the main portion 21 and is fixedly connected to the flange 10. The planetary bracket 30 includes a positioning portion 31, three support portions 33, and a mounting portion 35. The positioning portion 31 is substantially ring-shaped and is sleeved on the main portion 21, such that the positioning portion 31 is fixedly connected to the flange 10. Three first fixing holes 312 are defined around a periphery of the positioning portion 31. The three support portions 33 extend from the periphery of the positioning portion 31 toward the mounting portion 35, and are spaced from each other. Each support portion 33 is located between two first fixing holes 312. The mounting portion 35 is substantially disc-shaped, and is coaxial with the positioning portion 31. The mounting portion 35 and the positioning portion 31 cooperatively define three mounting spaces 331. Each mounting space 331 is formed between two adjacent support portions 33. A mounting hole 353 is axially defined through the mounting portion 35 and the positioning portion 31. The mounting hole 353 communicates with the three mounting spaces 331. The main portion 21 of the sleeve 20 is received through the mounting hole 353. In the illustrated embodiment, a diameter of the positioning portion 31 is smaller than that of the mounting portion 35. Three second fixing holes 351 are defined around a periphery of the mounting portion 35. The second fixing holes 351 correspond to the first fixing holes 312, respectively.

The three planetary gear assemblies 40 are mountably received in the three mounting spaces 331, respectively, and are fixed to the planetary bracket 30. Each planetary gear assembly 40 includes a planetary gear pair 41, a fixing shaft 43, and a plurality of rotation members 45. In the illustrated embodiment, the fixing shaft 43 is a pin, and the rotation member 45 is a needle roller. The planetary gear pair 41 is mountably received in the mounting space 331, and includes a first gear 412 and a second gear 413 coaxial with the first gear 412. A diameter of the first gear 412 is greater than that of the second gear 413. The first gear 412 is located adjacent to the mounting portion 35 and partly protrudes into the mounting hole 353. The second gear 413 is located adjacent to the positioning portion 31. The first gear 412 and the second gear 413 are sleeved on the fixing shaft 43 via a through hole 415 defined in a central portion of the first gear 412 and the second gear 413, respectively. Opposite ends of the fixing shaft 43 are fixedly received in the first fixing hole 312 and the second fixing hole 351, respectively. The rotation members 45 are sleeved on the fixing shafts 43 and are located between the positioning portion 31 and the mounting portion 35 of the planetary bracket 30, such that the rotation members 45 are received in the first gear 412 and the second gear 413 and resist an inner surface of the through hole 415. Thus, the planetary gear pair 41 is rotatable relative to the planetary bracket 30. In other embodiments, a number of the planetary gear assemblies 40 can be changed as needed, and a number of the first fixing holes 312, the second fixing holes 351, and the mounting spaces 331 can be changed accordingly.

The first bearing 50 is sleeved on the positioning portion 31 of the planetary bracket 30 with interference fit. The second bearing 60 is sleeved on the mounting portion 35 of the planetary bracket 30 with interference fit. In the illustrated embodiment, the first bearing 50 and the second bearing 60 are angular contact ball bearings. In other embodiments, only the first bearing 50 is used, and the second bearing 60 can be omitted.

The input member 70 is partly received in the mounting hole 353 and is sleeved on the main portion 21 of the sleeve 20. The input member 70 meshes with the first gears 412 of the three planetary gear pairs 41. The input member 70 includes an input gear 71 and a transmission gear 73 coaxial with the input gear 71. A through hole 712 is axially defined in the input gear 71 and the transmission gear 73, respectively. The input gear 71 is movably mounted on the mounting portion 35. The main portion 21 is received in the through hole 712, and is rotatably connected to the input gear 71 and the transmission gear 73. The transmission gear 73 is movably sleeved on the main portion 21 and is received in the mounting space 331 through the mounting hole 353, such that the transmission gear 73 meshes with and rotatably connects to the first gears 412 of the three planetary gear pairs 41.

The output member 80 is movably mounted on the planetary bracket 30, and is fixed to the second robotic arm 300. The output member 80 is a substantially stepped, hollow cylinder and includes a substantially ring-shaped main body 81 and a substantially ring-shaped transmission portion 83. The main body 81 is fixed to the second robotic arm 300 and is connected to the second bearing 60, such that the main body 81 is rotatable relative to the mounting portion 35 to move the second robotic arm 300. The transmission portion 83 extends from an inner periphery of the main body 81, and is fixed to the first bearing 50. A plurality of inner splines 831 is formed on an inner surface of the transmission portion 83 adjacent to the main body 81. The inner splines 831 mesh with the second gears 413 of the planetary gear pairs 41. In the illustrated embodiment, the first gears 412, the second gears 413, the input gear 71, the transmission gear 73, and the inner splines 831 are spur gears. In other embodiments, the first gears 412, the second gears 413, the input gear 71, the transmission gear 73, and the inner splines 831 can be bevel gears.

In assembly, the main portion 21 of the sleeve 20 is received in the through hole 11 of the flange 10 and the mounting hole 353 of the planetary bracket 30, such that the fixing portion 23 and the positioning portion 31 are fixedly mounted to opposite sides of the flange 10, respectively. Next, the three planetary gear assemblies 40 are movably received in the three mounting spaces 331. Then, the first bearing 50 and the second bearing 60 are sleeved on the positioning portion 31 and the mounting portion 35, respectively. The main body 81 of the output member 80 is fixed to the second robotic arm 300 and the second bearing 60, and the transmission portion 83 is fixed to the first bearing 50, such that the inner splines 831 mesh with the second gears 413 of the planetary gear pairs 41. Finally, the input gear 71 is movably mounted on the mounting portion 35, such that the transmission gear 73 meshes with the first gears 412 of the planetary gear pairs 41.

In use, a driving member (not shown) is mounted on the first robotic arm 200 and connected to the input gear 71 to drive the input member 70, the transmission gear 73 is driven to move the first gears 412, such that the second gears 413 rotate the output member 80 via the inner splines 831, and the second robotic arm 300 is rotatably moved relative to the first robotic arm 200.

The fixing shafts 43 pass through the planetary gear pairs 41, and are fixed to the planetary bracket 30, and the rotation members 45 are sleeved on the fixing shafts 43 and received in the through holes 415 to resist inner surfaces of the through holes 415, such that the planetary gear pairs 41 directly contact the planetary bracket 30. Thus, the first gears 412 and the second gears 413 rotate smoothly, and the speed reduction efficiency is improved.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:
1. A rotational speed-reduction device, comprising:
a flange;
a planetary bracket fixedly mounted on the flange, the planetary bracket comprising:
a mounting portion,
a positioning portion fixed to the flange, the positioning portion substantially parallel to and coaxial with the mounting portion, and
at least one support portion connecting the mounting portion and the positioning portion;
at least one planetary gear assembly movably mounted on the planetary bracket, the at least one planetary gear assembly comprising:
a planetary gear pair mounted between the positioning portion and the mounting portion,
a fixing shaft passing through the planetary gear pair, an end of the fixing shaft connected to the mounting portion and an opposite end of the fixing shaft connected to the positioning portion, and
at least one rotation member movably received between the planetary gear pair and the fixing shaft, and surrounding the fixing shaft, such that the planetary gear pair rotatable relative to the planetary bracket;
a first bearing sleeved on the planetary bracket;
an input member mounted on the planetary bracket and meshed with the planetary gear pair of the at least one planetary gear assembly; and
an output member sleeved on the first bearing, the output member meshed with the planetary gear pair of the at least one planetary gear assembly.

2. The rotational speed-reduction device of claim 1, wherein the planetary gear pair comprises a first gear and a second gear connected to and coaxial with the first gear, a first through hole is defined through the first gear and the second gear, the fixing shaft is received in the first through hole, the at least one rotation member is received in the first through hole and resists an inner surface of the first through hole.

3. The rotational speed-reduction device of claim 2, wherein a mounting hole is defined through a middle portion of the mounting portion and the positioning portion, the input member comprises a transmission gear, the transmission gear is movably received in the mounting hole; the first gear is positioned adjacent to the mounting portion, and partly protrudes into the mounting hole, such that the first gear meshes with the transmission gear; the second gear is positioned adjacent to the positioning portion.

4. The rotational speed-reduction device of claim 3, wherein the input member further comprises an input gear coaxial with the transmission gear, the input gear is movably mounted on the mounting portion.

5. The rotational speed-reduction device of claim 1, wherein at least one first fixing hole is defined around a periphery of the positioning portion, the at least one support portions is respectively positioned adjacent to the at least one first fixing hole; at least one second fixing hole is defined around a periphery of the mounting portion, corresponding to the at least one first fixing hole; the opposite ends of the fixing shaft are fixedly mounted in the at least one first fixing hole and the at least one second fixing hole, respectively.

6. The rotational speed-reduction device of claim 1, wherein the output member comprises a transmission portion, the transmission portion is fixed to the first bearing, such that the output member is rotatably connected to the planetary bracket.

7. The rotational speed-reduction device of claim 6, wherein the output member further comprises a main body coaxial with and connected to the transmission portion; the rotational speed-reduction device further comprises a second bearing, the second bearing is fixedly sleeved on the mounting portion and fixed to the main body.

8. The rotational speed-reduction device of claim 1, wherein a plurality of inner splines is formed on the output member, the planetary gear pair meshes with the plurality of inner splines.

9. The rotational speed-reduction device of claim 3, wherein the flange defines a second through hole, the input member defines a third through hole, the rotational speed-reduction device further comprises a sleeve, the sleeve passes through the second through hole, the mounting hole, and the third through hole in that order, and is fixed to an inner surface of the second through hole.

10. The rotational speed-reduction device of claim 9, wherein the sleeve comprises a fixing portion and a main portion extending from the fixing portion, the main portion of the sleeve passes through the second through hole, the mounting hole, and the third through hole, and is fixed to an inner surface of the second through hole, the fixing portion is fixed to the flange.

11. A rotational speed-reduction device, comprising:
a flange;
a planetary bracket fixedly mounted on the flange, the planetary bracket comprising:
a mounting portion,
a positioning portion fixed to the flange, the positioning portion substantially parallel to and coaxial with the mounting portion, and
at least one support portion connecting the mounting portion and the positioning portion;
at least one planetary gear assembly movably mounted on the planetary bracket, the at least one planetary gear assembly comprising:
a planetary gear pair mounted between the positioning portion and the mounting portion, the planetary gear pair comprising a first gear and a second gear connected to and coaxial with the first gear, a first through hole defined through the first gear and the second gear,
a fixing shaft passing through the first through hole, an end of the fixing shaft connected to the mounting portion and an opposite end of the fixing shaft connected to the positioning portion, and
at least one rotation member movably received in the first through hole between the planetary gear pair and the fixing shaft, and sleeved on the fixing shaft, such that the at least one rotation member resisting an inner surface of the first through hole, the planetary gear pair being rotatable relative to the planetary bracket;
a first bearing sleeved on the planetary bracket;
an input member mounted on the planetary bracket and meshed with the planetary gear pair of the at least one planetary gear assembly; and
an output member sleeved on the first bearing, the output member meshed with the planetary gear pair of the at least one planetary gear assembly, the output member comprising a transmission portion, the transmission portion fixed to the first bearing.

12. The rotational speed-reduction device of claim 11, wherein a mounting hole is defined through a middle portion of the mounting portion and the positioning portion, the input member comprises a transmission gear, the transmission gear is movably received in the mounting hole; the first gear is positioned adjacent to the mounting portion, and partly protrudes into the mounting hole, such that the first gear meshes with the transmission gear; the second gear is positioned adjacent to the positioning portion.

13. The rotational speed-reduction device of claim 12, wherein the input member comprises an input gear coaxial with the transmission gear, the input gear is movably mounted on the mounting portion.

14. The rotational speed-reduction device of claim 11, wherein at least one first fixing hole is defined around a periphery of the positioning portion, the at least one support portions is respectively positioned adjacent to the at least one first fixing hole; at least one second fixing hole is defined around a periphery of the mounting portion, corresponding to the at least one first fixing hole; the opposite ends of the fixing shaft are respectively fixedly mounted in the at least one first fixing hole and the at least one second fixing hole.

15. The rotational speed-reduction device of claim 11, wherein the output member further comprises a main body coaxial with and connected to the transmission portion; the rotational speed-reduction device further comprises a second bearing, the second bearing is fixedly sleeved on the mounting portion and fixed to the main body.

16. The rotational speed-reduction device of claim 11, wherein a plurality of inner splines is formed on the transmission portion, the planetary gear pair meshes with the plurality of inner splines.

17. The rotational speed-reduction device of claim 12, wherein the flange defines a second through hole, the input member defines a third through hole, the rotational speed-reduction device further comprises a sleeve, the sleeve passes through the second through hole, the mounting hole, and the third through hole in that order, and is fixed to an inner surface of the second through hole.

18. The rotational speed-reduction device of claim 17, wherein the sleeve comprises a fixing portion and a main portion extending from the fixing portion, the main portion of the sleeve passes through the second through hole, the mounting hole, and the third through hole, and is fixed to an inner surface of the second through hole, the fixing portion is fixed to the flange.

* * * * *